United States Patent [19]
Wilcox et al.

[11] Patent Number: 6,095,190
[45] Date of Patent: Aug. 1, 2000

[54] COUPLING WITH FEMALE HALF HAVING INTERNAL PRESSURE RELIEF

[75] Inventors: Wayne Wilcox, Waterford; Douglas F. Hopson, Union City, both of Pa.

[73] Assignee: Snap-Tite Technologies, Inc., Wilmington, Del.

[21] Appl. No.: 09/193,346

[22] Filed: Nov. 17, 1998

[51] Int. Cl.[7] .................................................. F16L 37/28
[52] U.S. Cl. ................................ 137/614.04; 137/614.03; 137/614; 251/149.6
[58] Field of Search ............................... 137/614.02, 614, 137/614.04, 614.03, 614.05; 251/149.6, 149.1

[56] References Cited

U.S. PATENT DOCUMENTS

| | | |
|---|---|---|
| 3,498,324 | 3/1970 | Breuning . |
| 3,570,543 | 3/1971 | Ekman ................................. 137/614.04 |
| 3,791,411 | 2/1974 | Bogeskov et al. ....................... 137/614 |
| 4,986,304 | 1/1991 | Vanderjagt .......................... 137/614.02 |
| 5,592,970 | 1/1997 | Stucchi et al. . |
| 5,918,633 | 7/1999 | Zeiber .................................... 137/614 |

FOREIGN PATENT DOCUMENTS

WO 98/19097  5/1998  WIPO .

*Primary Examiner*—Gregory L. Huson
*Assistant Examiner*—Joanne Y. Kim
*Attorney, Agent, or Firm*—Woodling, Krost & Rust

[57] ABSTRACT

A coupling having male and female halves is disclosed. Typically the female half is under pressure. The female half may be mounted to an implement and when coupled to a male coupling on the tractor. It supplies hydraulic fluid to the driven device. The female half has three valves: a main valve, a relief valve and a sliding sleeve valve. The female half, when coupled, opens the sliding sleeve valve first followed by the opening of the relief valve which is followed by the opening of the main valve. The relief valve is designed to reduce pressure behind the main valve so as to permit easy coupling under pressure when the female half is under pressure. During the uncoupling process, the main valve closes first followed by the closure of the relief valve which is followed by the closure of the sliding sleeve valve. The relief valve is a ball and seats against an elastomeric seal mounted in the back side of the main valve. A push pin having flat edges operates the relief valve. The main valve includes ports for increasing the capacity of the relief valve during coupling of the male and female halves together.

16 Claims, 11 Drawing Sheets

COUPLING WITH FEMALE HALF HAVING INTERNAL PRESSURE RELIEF

FIELD OF THE INVENTION

The invention is a coupling which may be connected with pressure on the female half. Typically, the invention is used on agricultural implements such as tractors or small versions thereof. The female half of the coupling includes a relief valve which is operated during connection with the male thus enabling easy coupling with a pressurized female half.

BACKGROUND OF THE INVENTION

International Publication WO 98/19097 published May 7, 1998 and filed Oct. 17, 1997 by applicant STUCCHI S. R. L. discloses a male half of the coupling in FIG. 1 thereof which includes a seal 40 carried in a fixed body 32, a piston 37, a safety valve 37 abutting an inner element 34, and, a relief valve 46 being a ball valve 46 actuated by pin 45 for venting to chamber 48. U.S. Pat. No. 5,592,970 to Stucchi et al. issued Jan. 14, 1997 discloses structure similar to WO 98/19097 except the relief valve and pin are missing. The '970 patent is directed to preventing the blowout of seal 40 by covering it with bush 10.

The structure disclosed in WO 98/19097 will leak by the ball valve 46 and the interface between valve 73 and inner body member 34 at low pressures, for example, below 500 psig. Leaking around valve 46 and the interface negates the purpose of the relief valve 46 as the volume available will be filled. Leakage may occur at pressures greater than 500 psig but the increased pressures tend to enhance the metal to metal seals employed by STUCCHI S. R. L. in WO 98/19097.

U.S. Pat. No. 3,498,324 to Breuning discloses secondary valves which first engage each other and open causing a flow through the secondary flow passages from the high pressure side to the low pressure side of the coupling.

The instant invention provides a relief valve which seats on a seal in the female half of the coupling. A high capacity passageway is supplied through the main valve of the female half of the coupling. The relief valve of the instant invention is actuated by a first actuator and a second actuator (push pin) having flat sides. Ports are supplied in the main valve to provide increased venting capacity. The first actuator is driven toward the second actuator (push pin) by a sliding sleeve valve under the urging of the male half of the coupling.

SUMMARY OF THE INVENTION

The invention provides a coupling comprising a male half and a female half. The female half comprises a body and an adaptor threaded together. The female member also includes an intermediate member, a seal gland having a main valve seat, a first actuator and a second actuator sometimes referred to as a push pin. A main valve having a vent valve, an interior seat, and a vent port are also found in the female half of the coupling.

Referring still to the female valve, a sliding sleeve valve resides adjacent the first actuator and the second actuator resides adjacent the first actuator. The second actuator is sometimes referred to herein as a push pin. The push pin in the preferred embodiment includes flat edges so to permit flow therearound to relieve pressure behind the valve. An inner and an outer valve guide are employed in the female half of the coupling and the inner valve guide is affixed to the main valve. A first spring is operable between the outer valve guide and the main valve urging the main valve into engagement with the main valve seat of the seal gland.

The vent valve includes a ball valve and a second spring is operable between the ball valve and the inner valve guide urging the ball valve into engagement with the interior seat of the main valve. The inner valve guide and the main valve can be affixed together by various means such as threads or a press fit. A pintle retainer is secured in place with respect to the seal gland and the intermediate member. The seal gland and intermediate member are held in place relative to the body and the adaptor. A pintle is affixed to the pintle retainer.

The seal gland and the intermediate member are affixed to the adaptor and the body member. A third spring is operable between the engaging sleeve and the intermediate member. A fourth spring is operable between the intermediate member and the sliding sleeve valve. The body includes a plurality of apertures and a plurality of locking balls reside in those apertures. A locking sleeve retains the plurality of locking balls in the plurality of apertures of the body. A fifth spring is operable between the body and the locking sleeve urging the locking sleeve in a direction away from the adaptor.

In the process of connecting the male half of the coupling to the female half of the coupling, the sleeve valve unseats from the pintle followed by unseating of the relief valve from the main valve followed by unseating of the main valve from the body.

The male half of the coupling includes a body threaded to an adaptor. The body engages with and locks to the female when the male and the female are coupled together. The male further includes a valve having a guide which is supported by a spring support and guide. A spring urges the valve of the male to the closed position when the male is not coupled to the female.

It is an object of the present invention to provide a female half of a coupling which can be connected under pressure.

It is an object of the present invention to provide a female half of a coupling which can be connected under pressure by internally venting the female half of the coupling.

It is an object of the present invention to provide a female half of a coupling which has three valves, a sleeve valve, a main valve and a relief valve.

It is an object of the present invention to provide a female half of a coupling which has three valves, a sleeve valve, a main valve and a relief valve with the sleeve valve opening first followed by the relief valve opening which is followed by the main valve opening during coupling with the male half of the coupling.

It is an object of the present invention to provide a female half of a coupling which has three valves, a sleeve valve, a main valve and a relief valve with the main valve closing first followed by the relief valve closing followed by the sleeve valve closing upon uncoupling the female half of the coupling from the male half of the coupling.

It is an object of the present invention to provide a female half of the coupling which includes: a relief valve; a main valve having a seal, a bore therethrough, and a port communicating with the bore; a push pin for operating the relief valve and having flat edge surfaces.

It is an object of the present invention to provide a male half of the coupling which includes a seal carried in the body of the male half of the coupling.

Further objects of the invention will be understood when referring to the Brief Description Of The Drawings, Description Of The Invention and claims which follow hereinbelow.

BRIEF DESCRIPTION OF THE DRAWINGS

FIG. 8 also illustrates the first actuator spaced apart from the second actuator, the push pin.

DESCRIPTION OF THE INVENTION

Figure 1:
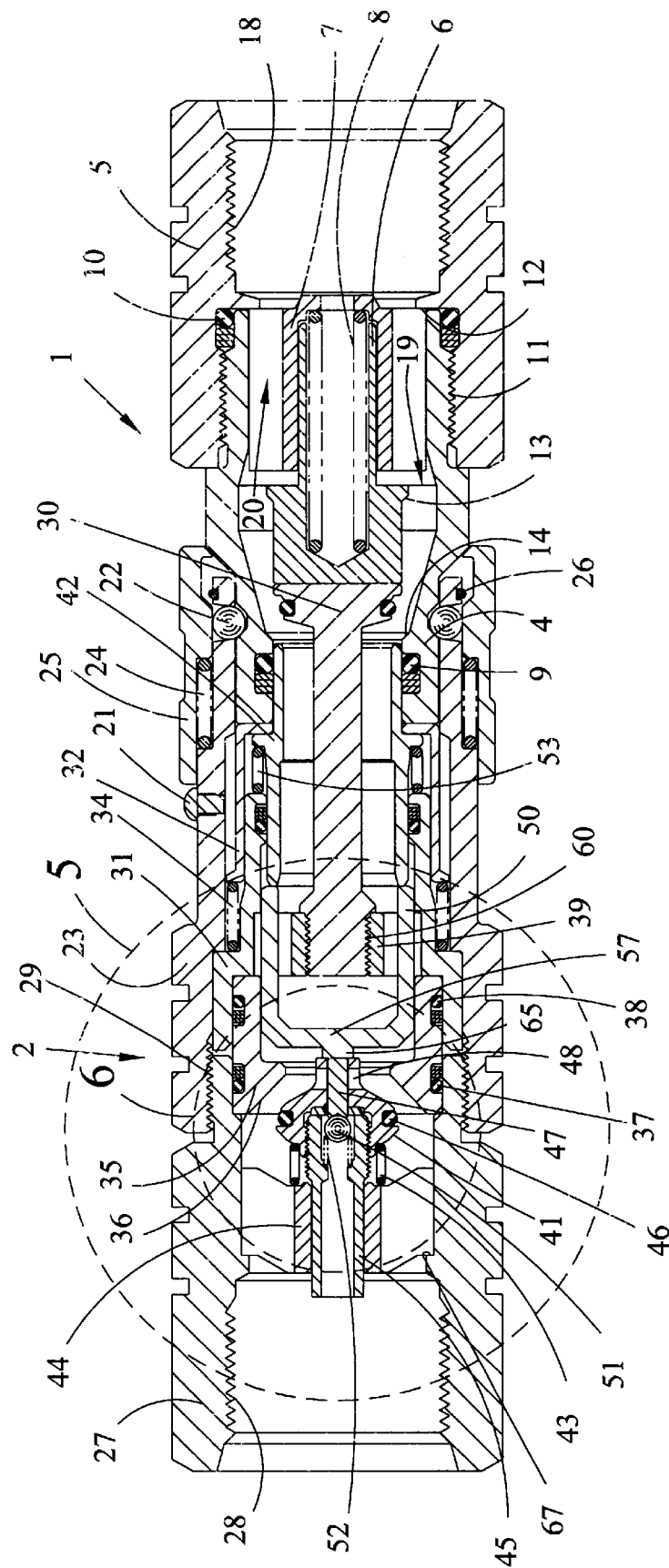
FIG. 1 is a cross-sectional view of the coupling with the male and female halves fully coupled together. The female half includes three valves, the main valve, the relief valve and the sleeve valve, all of which are open in this view.
Figure 2:
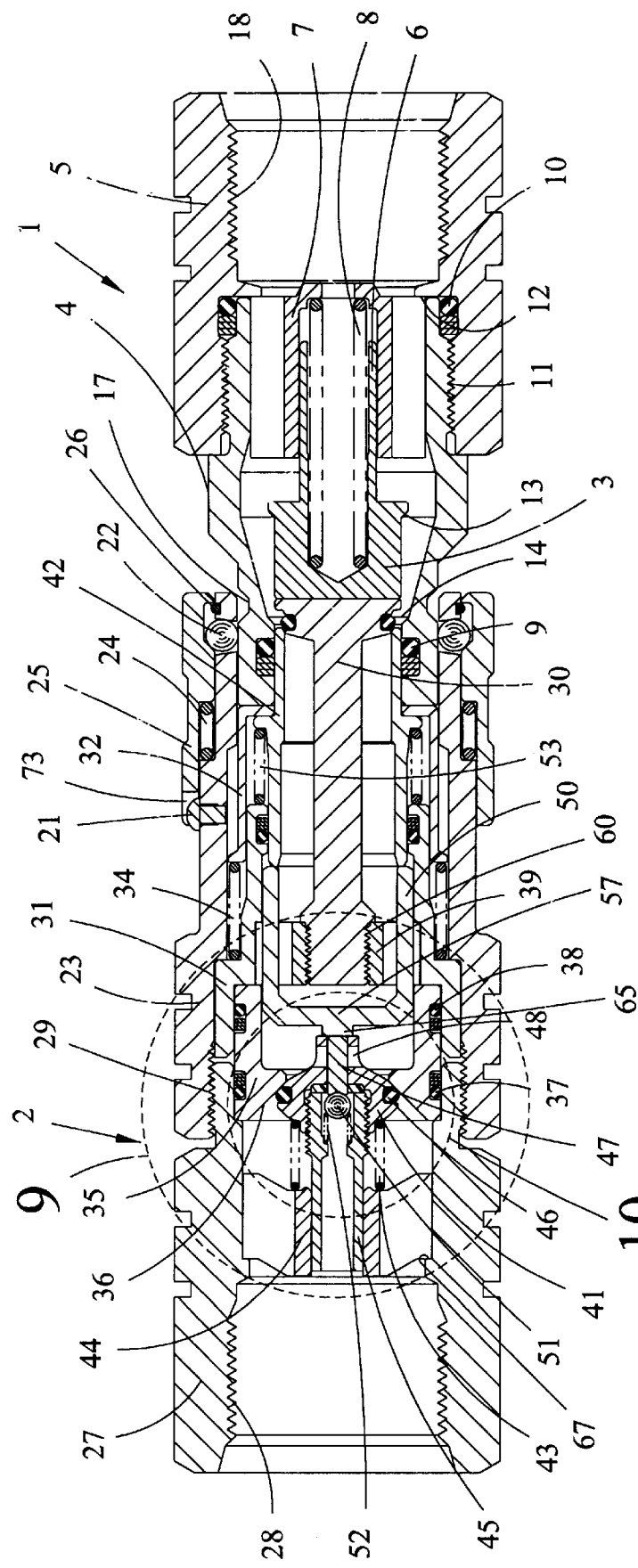
FIG. 2 is a cross-sectional view of the coupling in the process of being uncoupled or coupled.
Figure 11:
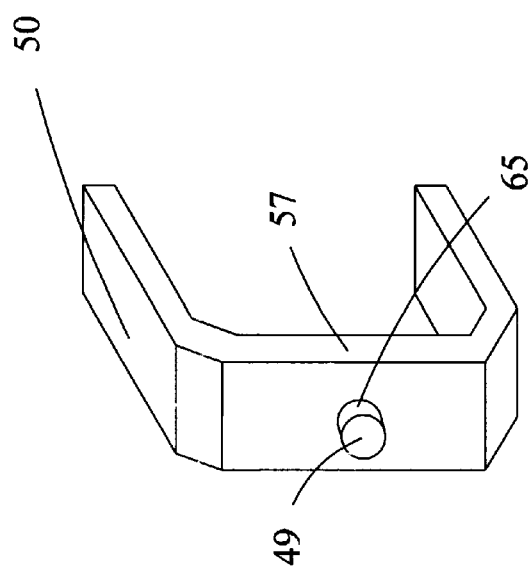
FIG. 11 is an enlarged isometric view of the first actuator.

FIG. 1 is a cross-sectional view of the coupling with the male 1 and female 2 halves fully coupled together. The female half 2 includes three valves, the main valve 41, the relief valve 51 and the sleeve valve 42, all of which are open in this view. Reference numerals 19 and 20 are flow arrows. The flow between the coupling halves can be in either direction but obviously not at the same time. First actuator 50, when viewing FIGS. 1 and 2, for example, appears to block flow through the female half 2 of the coupling. FIG. 11 is an enlarged isometric view of the actuator 50 which better enables the understanding of the other drawing figures. Flow occurs around the middle section 57 of the first actuator.

Figure 12:
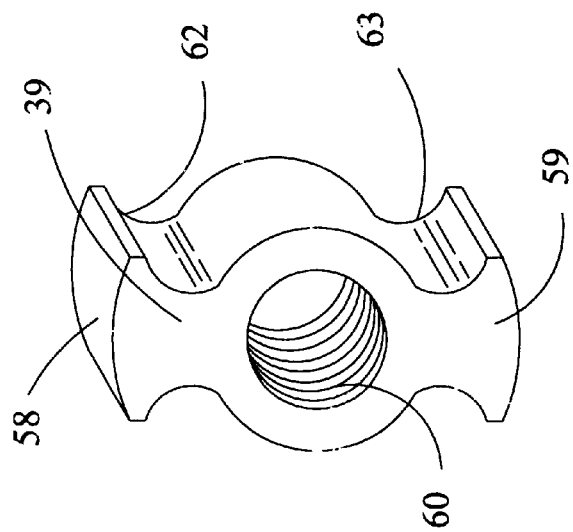
FIG. 12 is an enlarged isometric view of the pintle retainer.

First actuator 50 is free to rotate within the limits of the pintle retainer 39. First actuator 50 is free to rotate within the limits of surfaces 62 and 63 of pintle retainer 39. Pintle retainer 39 is not moveable with respect to the body 23 and adaptor 27 of the female half 2 of the coupling. Pintle retainer 39 is best viewed in FIG. 12 and includes end portions 58 and 59 which are secured between the seal gland 35 and the intermediate member 31. Intermediate member 31 is axially secured to the body 23 as it is trapped by the seal gland 35 against body 23 by the threaded interconnection 29 of the body 23 and the adaptor 27. See, FIGS. 1, 2, 3 and 5. Pintle retainer 39 is shown in cross-section in FIGS. 1, 2 and 3 and is secured by end portions 58 and 59 which are not amenable to illustration in those drawing figures.

Threads 60 on pintle retainer 39 secure the pintle 31 in place, to wit, so that it is not moveable with respect to the female body 23 and adaptor 27 of the coupling. Snap ring 26 resides in a groove in the right end portion of the body 23. Adaptor 27 includes threads 28 for interconnecting with a hydraulic hose or pipe.

Figure 3:
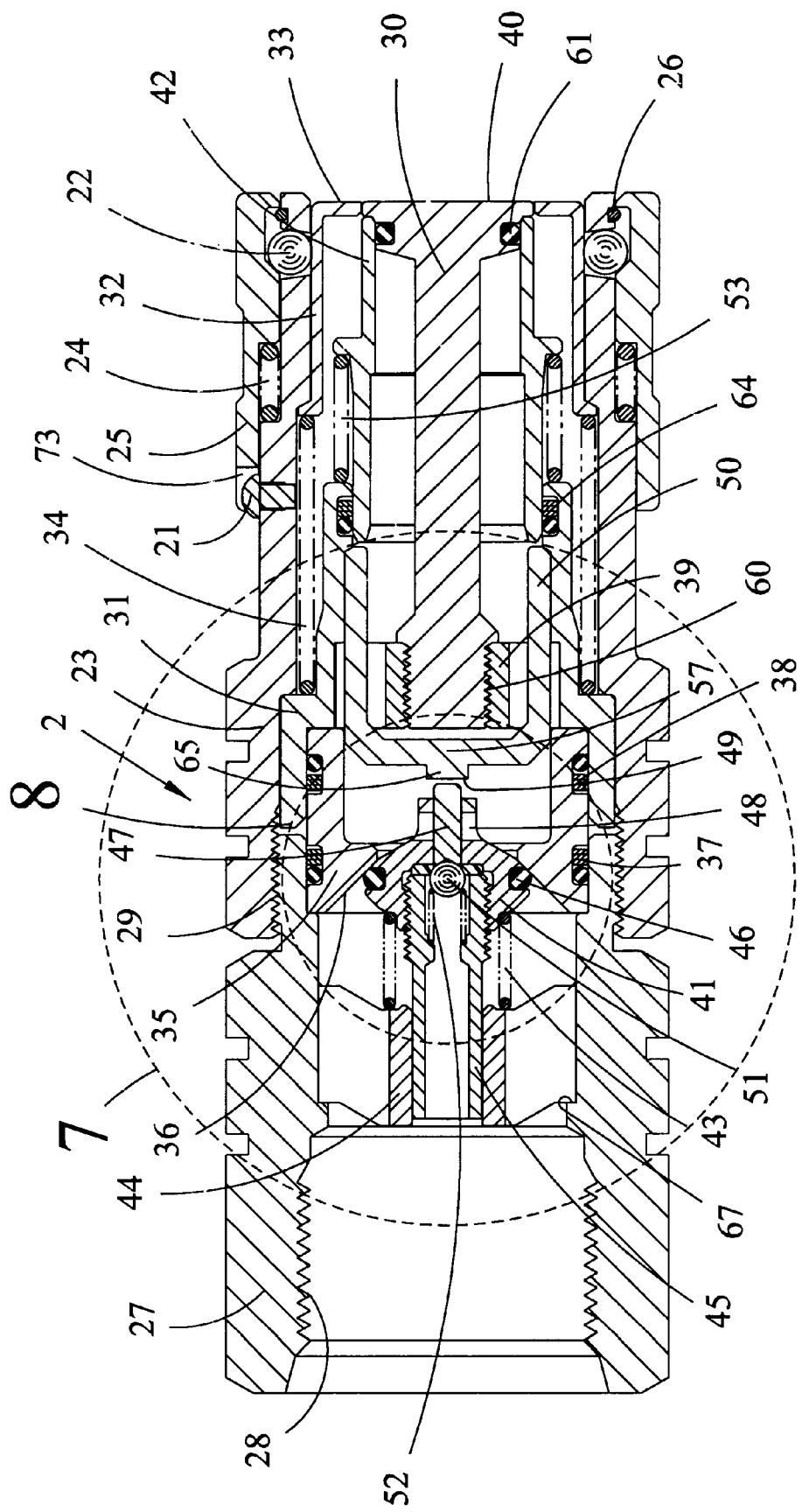
FIG. 3 is a cross-sectional view of the female half of the coupling illustrating the main, relief and sleeve valves closed.
Figure 4:
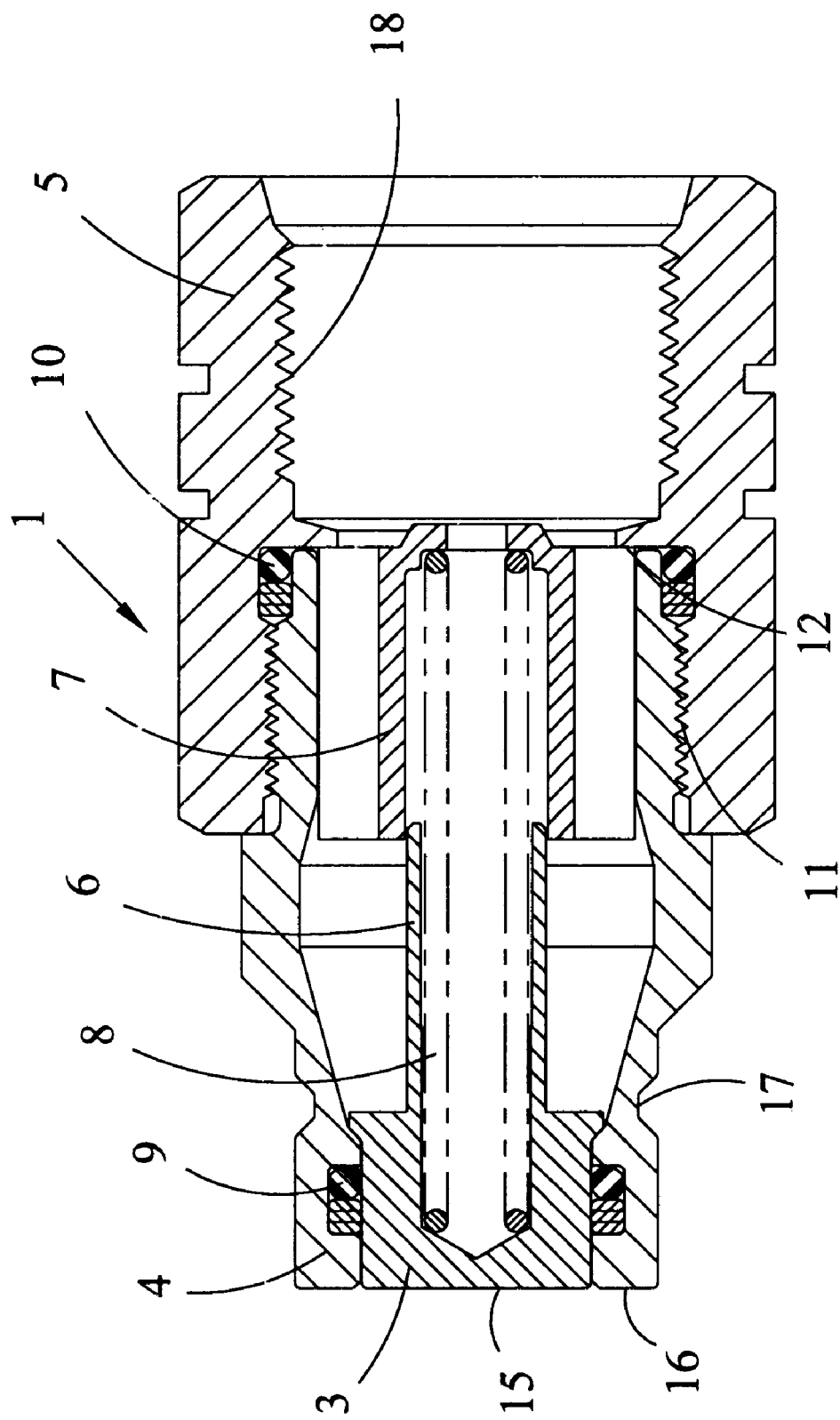
FIG. 4 is a cross-sectional view of the male half of the coupling.
Figure 5:
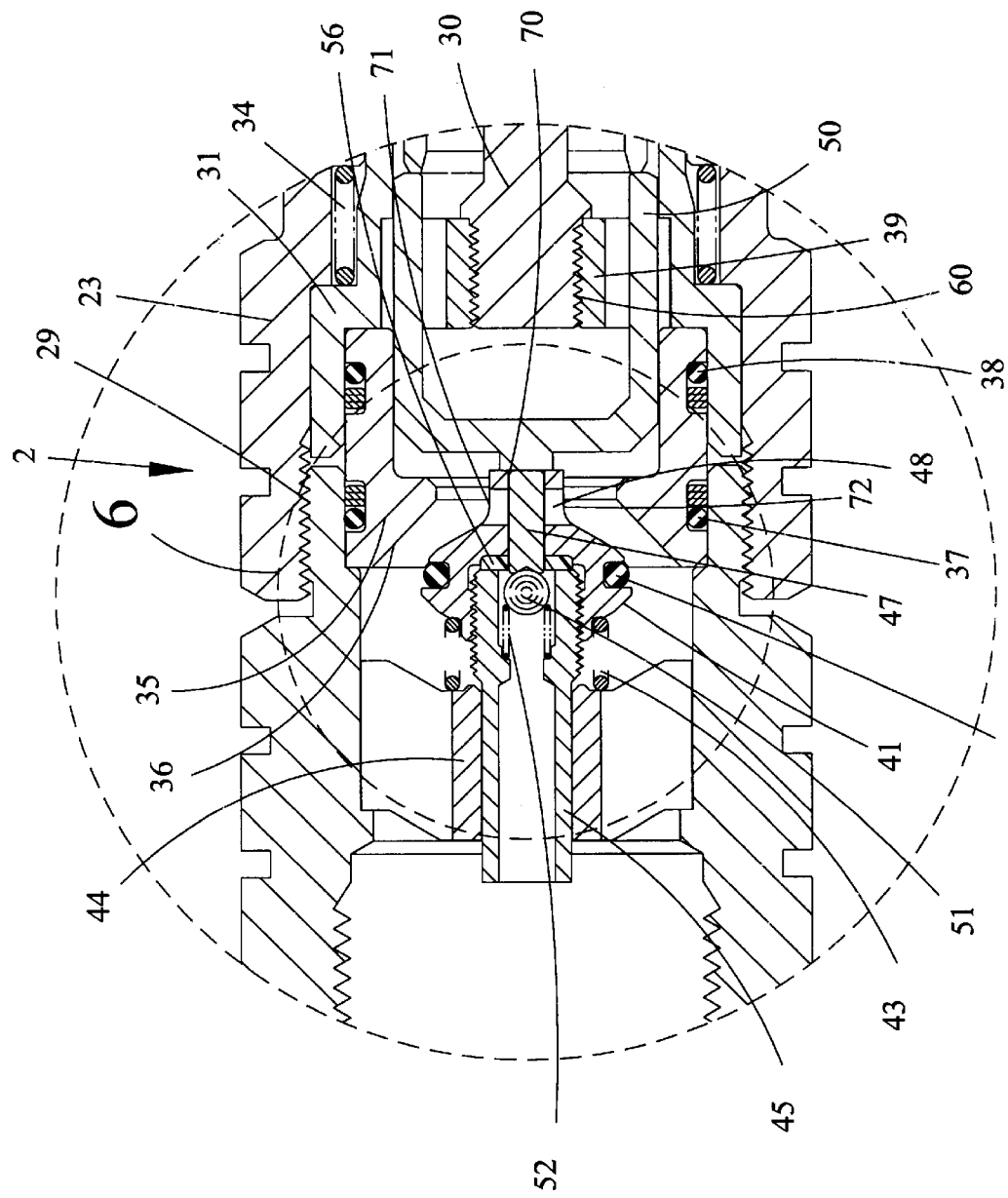
FIG. 5 is an enlargement of a portion of the female half of the coupling as shown in FIG. 1 illustrating the actuator holding the relief valve and main valve.
Figure 6:
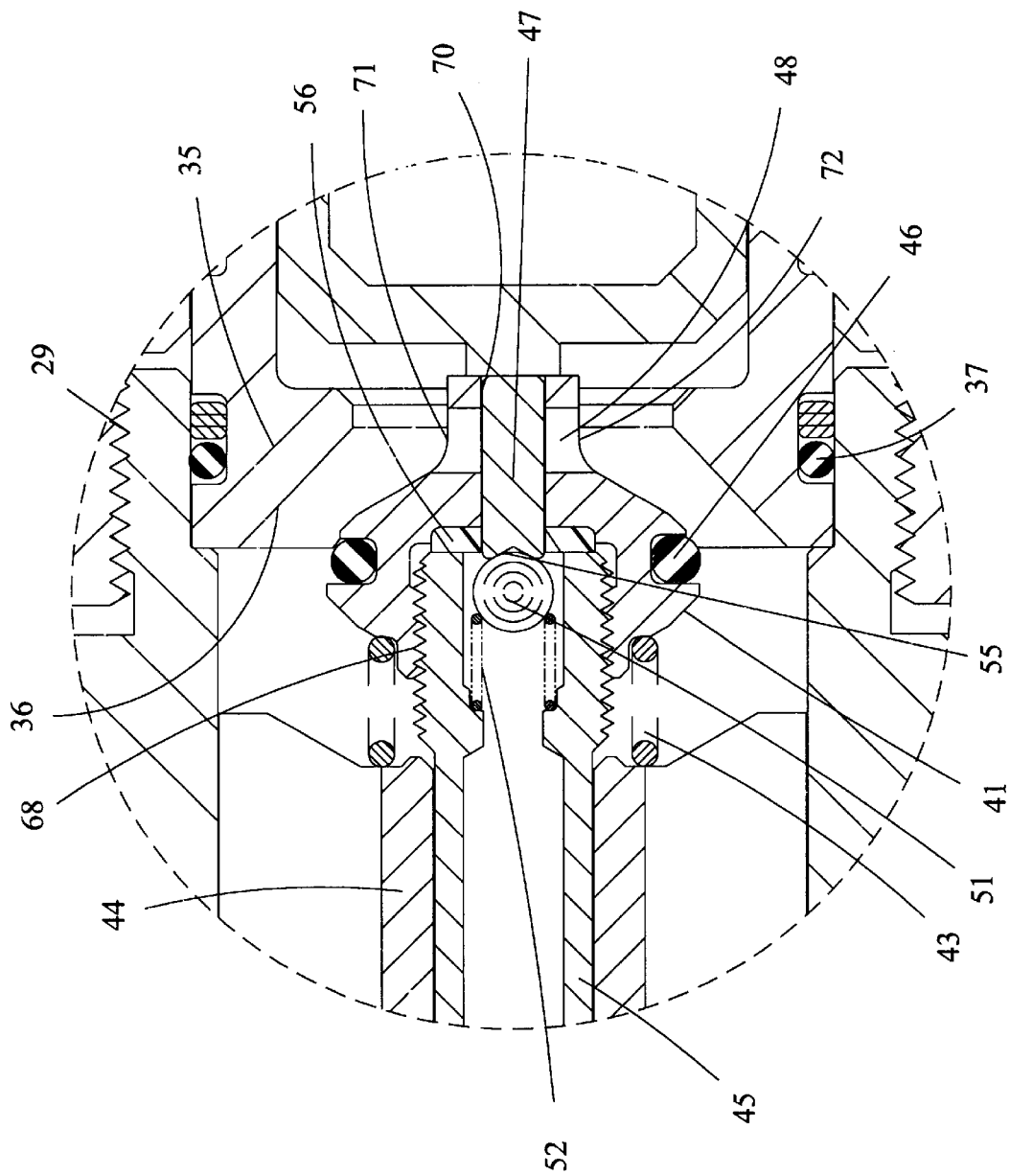
FIG. 6 is a further enlargement of a portion of FIG. 5 illustrating the relief valve spaced apart from the seal in the back side of the main valve.

FIG. 3 is a cross-sectional view of the female half of the coupling illustrating the main 41, relief 51 and sleeve 42 valves closed. FIG. 3 illustrates the face 40 on the pintle valve 30. Engaging sleeve 32 includes face 33. Face 33 and face 40 engage the male half of the coupling; specifically, face 40 of pintle 30 engages face 15 of male valve 3 and face 33 of the engaging sleeve 32 engages face 14 of male body 4. FIG. 4 is a cross-sectional view of the male half 1 of the coupling. Male body 4 includes a notch 17 to engage with detents 22 in the female half for securing the halves together as illustrated in FIG. 1.

Referring to FIG. 4, male valve 3 is urged into engagement with male body 4 by spring 8 acting between the male valve 3 and the male valve guide and stop 7. In particular, male valve stem 6 of male valve 3 is guided by the male valve guide and stop 7. Adaptor 5 is threaded to male body 4 by threaded interconnection 11 between the adaptor 5 and the male body 4. Male valve guide and stop 7 is supported by shoulder 12 of the adaptor 5. Adaptor 5 includes threads 18 for mating with a hydraulic hose or pipe. Seal 9 seals between the male valve 3 and the male body 4. Seals 10 seal between the adaptor 5 and body 4. Shoulder 14 on the male body engages shoulder 13 on the male valve retaining the valve 3. See FIG. 1.

Figure 7:
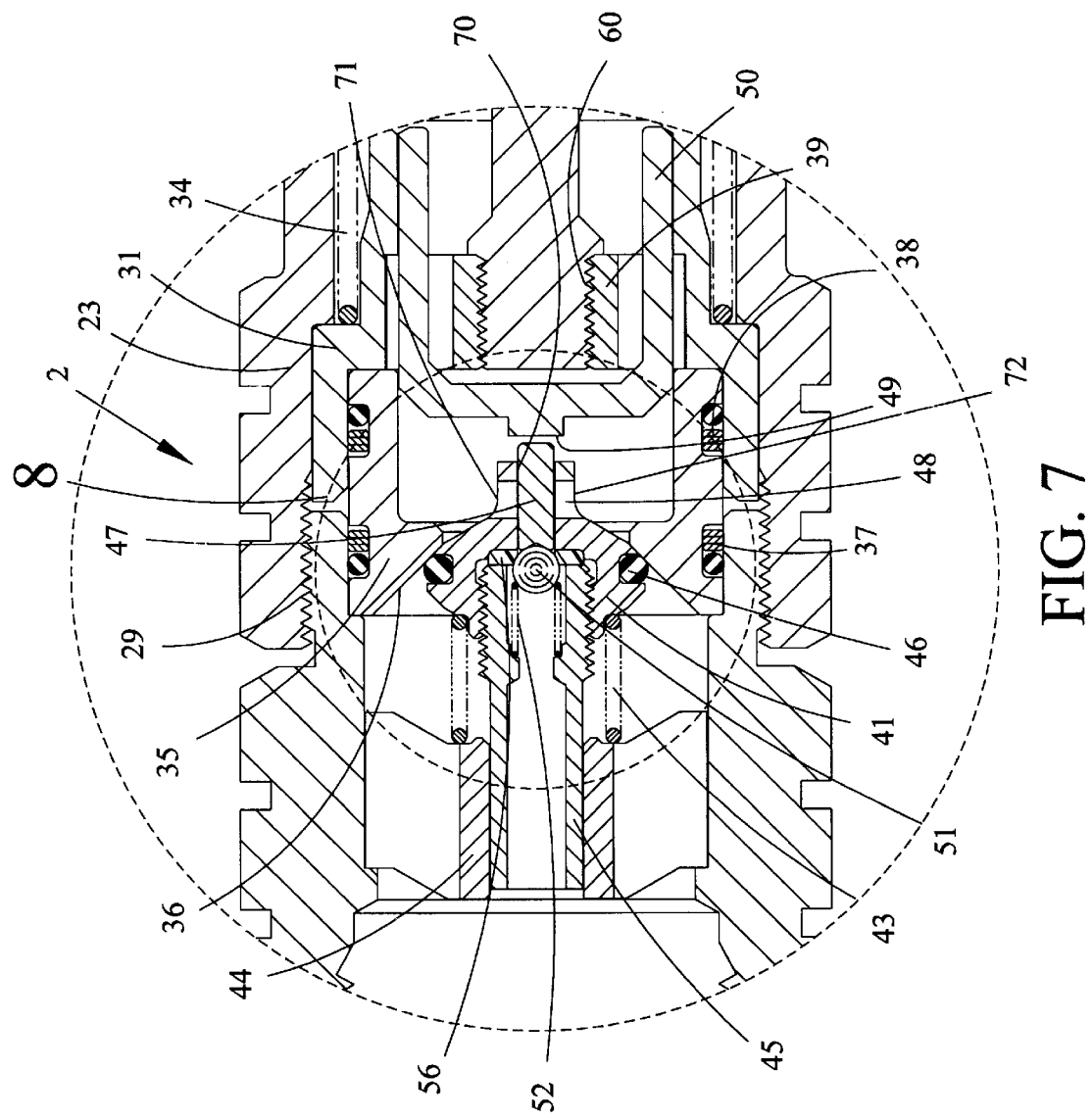
FIG. 7 is an enlargement of a portion of the female valve as shown in FIG. 3 illustrating the main valve and the relief closed.
Figure 8:
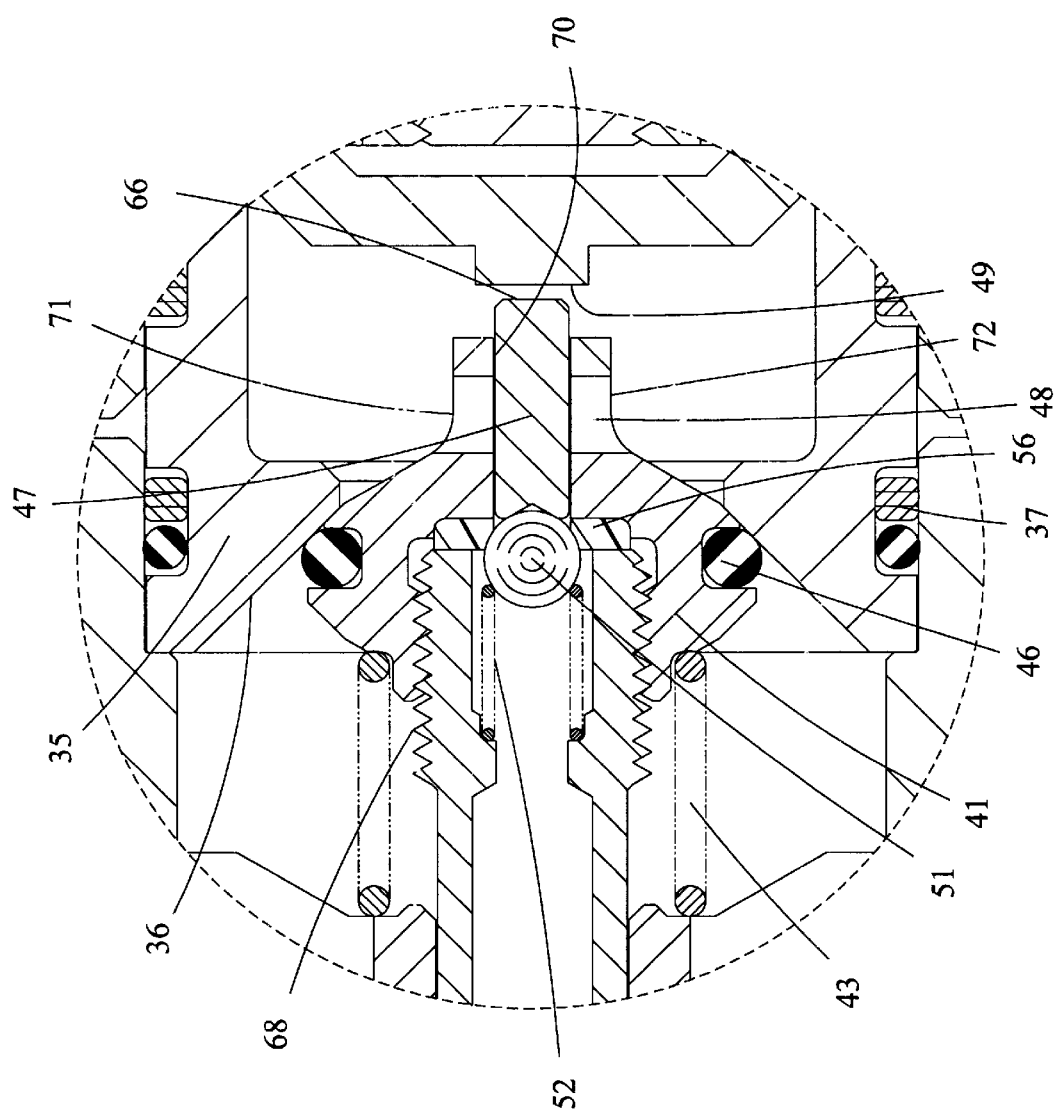
FIG. 8 is a further enlargement of FIG. 7 illustrating the relief valve seated against the seal in the back side of the main valve.
Figure 9:
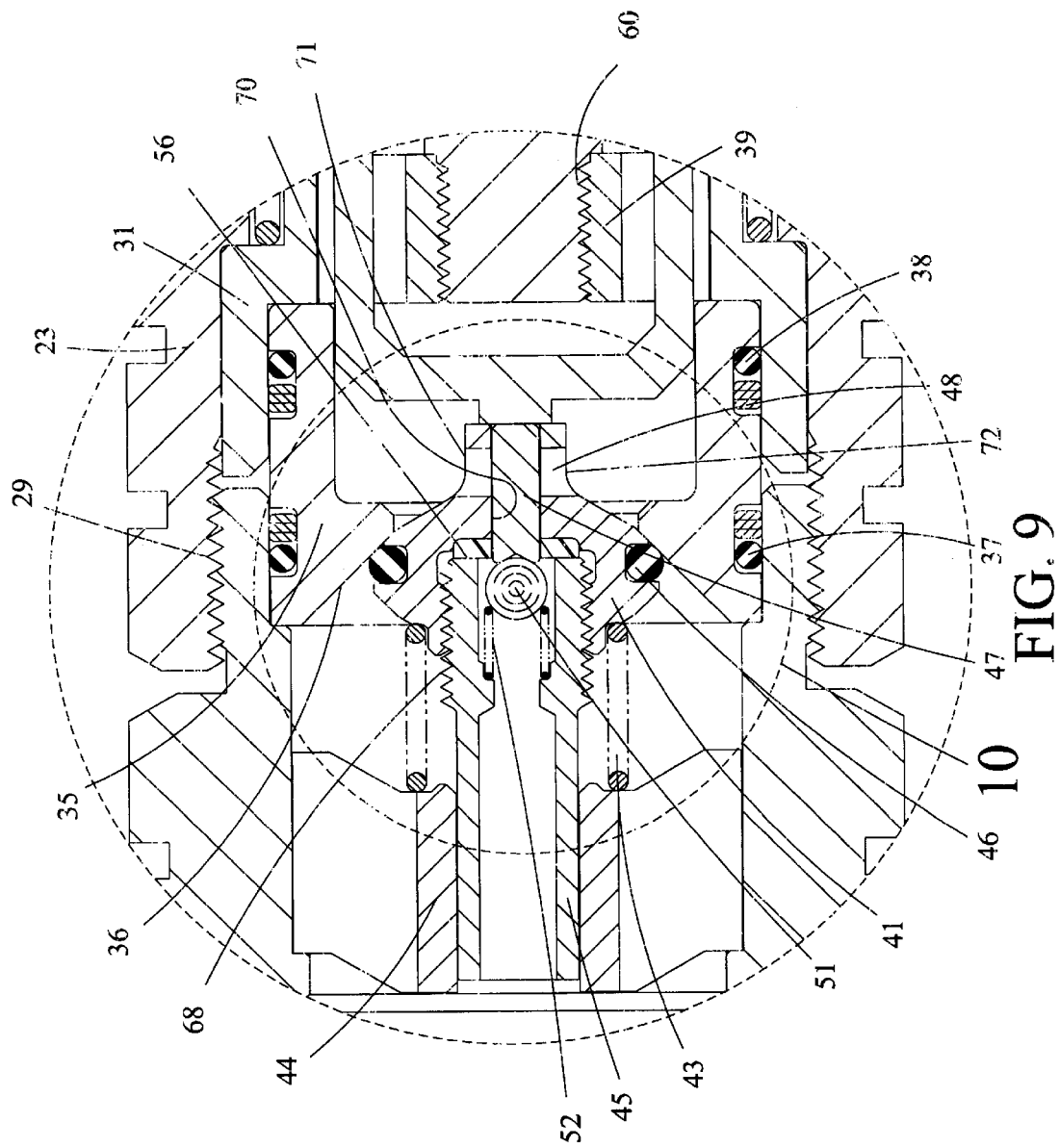
FIG. 9 is an enlargement of a portion of the female half of the coupling as shown in FIG. 2 which illustrates the coupling in the process of being uncoupled or coupled.
Figure 10:
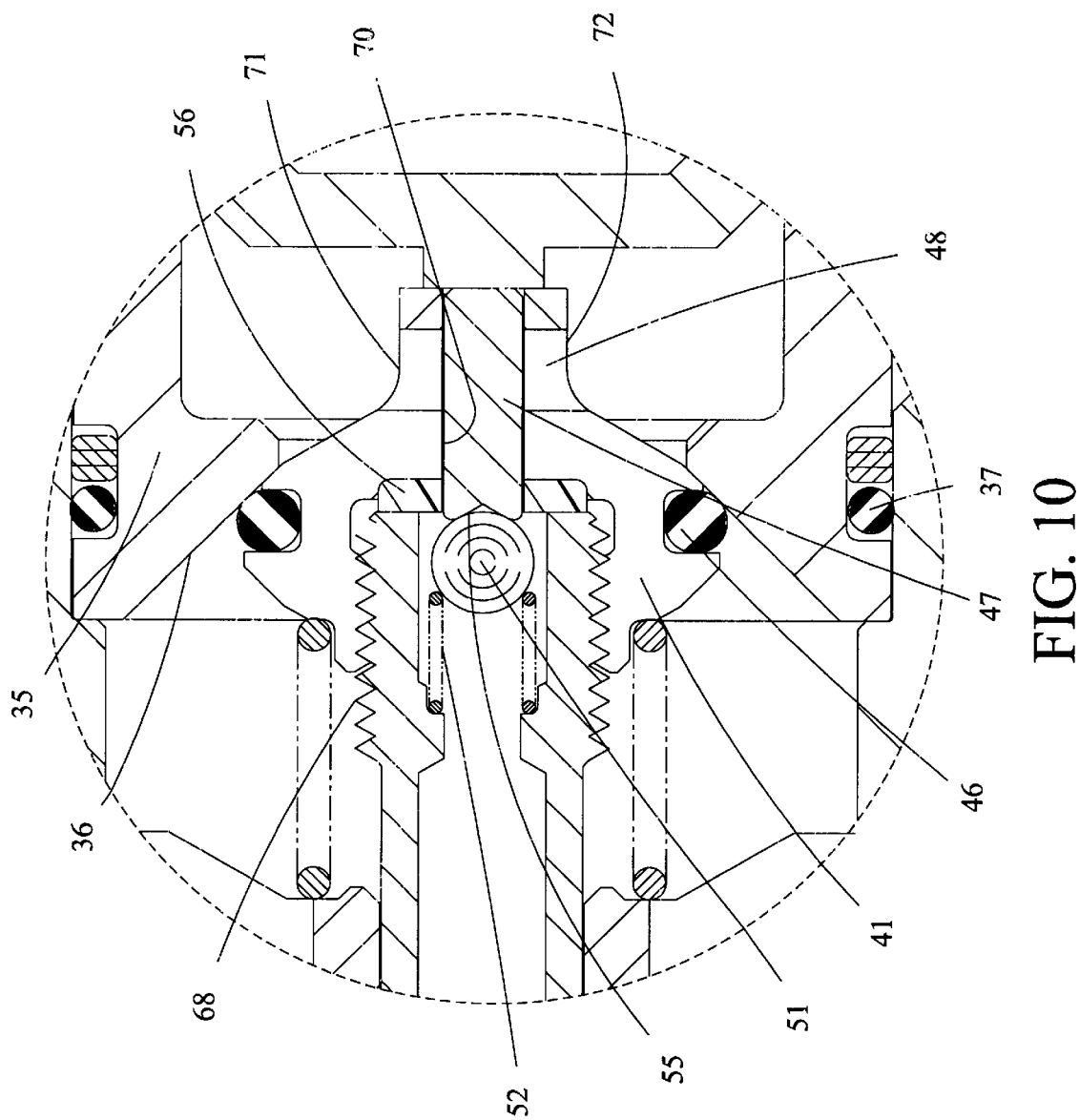
FIG. 10 is a further enlargement of FIG. 9 illustrating the relief valve unseated.

Referring to FIGS. 3, 7 and 8, spring support and outer valve guide 44 engage shoulder 67 of adaptor 27 of the female half of the coupling. Spring 43, sometimes referred to as first spring 43, operates between support and valve guide 44 and the main valve 41. Threaded interconnection 68 affixes the main valve to the inner valve guide 45. Ball valve 51 operates against seal 56 when the coupling is uncoupled as illustrated in FIGS. 3, 7 and 8. Seal 56 in the preferred embodiment is an elastomeric seal. Spring 52, sometimes referred to herein as the second spring, operates between the ball valve 51 and the inner valve guide 45 and urges the ball valve 51 into engagement with the elastomeric seal 56 as illustrated in FIGS. 3, 7 and 8.

Figure 13:
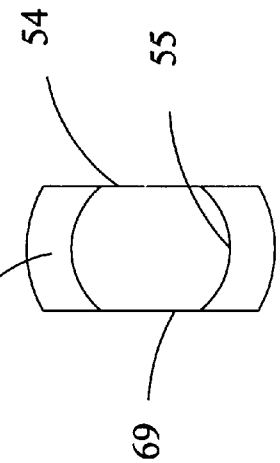
FIG. 13 is an enlarged end view of the second actuator also known as the push pin.

Referring to FIGS. 1, 2, 5, 6, 9, and 10, the push pin 47 under the urging of the first actuator 50, forces the ball valve 51 away from the seal 56. This allows pressure behind the main valve 41 to be released. Push pin 47, illustrated in FIG. 13, includes flat edges 54 and 69. Push pin 47 includes a concave face 55 for stabilization of ball valve 51 when push pin forces it off of seal 56. The concavity is illustrated in FIG. 13, an end view of the push pin 47.

Push pin 47 resides in a longitudinal bore 70 of the main valve 41. Longitudinal passageways are formed between flat edges 54 and 69 and the longitudinal bore enabling hydraulic fluid in sufficient quantity to flow to the transverse bore 48 in main valve 41. Transverse bore 48 terminates in ports 71 and 72.

Referring to FIG. 3, reference numeral 73 indicates an interior volume or space to which fluid from behind (leftward) the main valve may be discharged to reduce pressure behind the main valve to facilitate its opening upon coupling with the male half of the coupling. Main valve seal 46 seals against the valve seat 36 on the seal gland 35 trapping pressure behind the main valve 41.

Referring to FIG. 3, sliding sleeve valve 42 abuts and seals against pintle 30. Seal 61 is carried by the pintle 30 and seals against pintle 30. Spring 53 is operable between the intermediate member 31 and the sliding sleeve valve 42 urging the sliding sleeve valve into engagement with the fixed pintle. Seal 64 seals between the sliding sleeve valve 42 and the intermediate member 31. Spring 34 operates between intermediate member 31 and engaging sleeve 32 urging sleeve 32 into engagement with female body 23. Spring 24 acts between the female body 23 and locking sleeve 25 urging the locking sleeve into engagement with detent balls 22.

Stop 21 is pressed into female body 23 to prevent the unintended uncoupling of the male and female halves. Slot 73 in locking sleeve 25 requires alignment with stop 21 to effect disengagement (uncoupling) of the male and female halves of the coupling. See, FIG. 1, where the slot is not in alignment with stop 21.

Referring to FIG. 3, seal 37 seals between the seal gland 35 and the adaptor 27. Seal 38 seals between seal gland 35 and female body 23. First actuator 50 resides intermediate sliding sleeve valve 42 and second actuator 47, also described herein as the push pin. Protrusion 65 of actuator 50 includes a face 49 which engages face 66 on push pin 47 when the mate and female halves are coupled together as shown in FIG. 1. See, FIG. 8 to view the face 66 of push pin 47 separated from the face 49 of protrusion 65 of actuator 50.

As the male half of the coupling enters the female half, faces 15 and 16 of the male half respectively engage faces 40 and 33 of the female half. See, FIG. 3. Face 16 drives engaging sleeve 33 leftwardly against the force of spring 34, sometimes referred to herein as the third spring 34. As the coupling process proceeds, engaging sleeve 32 engages the sliding sleeve valve 42 against the force of spring 53 (sometimes referred to herein as the fourth spring) opening the sliding sleeve valve 42 and forcibly engaging the first actuator 50 and driving it into engagement with push pin 47. As the coupling action proceeds, push pin 47 unseats ball valve 51 from seal 56 against the force of spring 52, sometimes referred to herein as the second spring 52. When ball valve 51 unseats, hydraulic fluid passes into the passageway formed between the flat edges 54 and 69 of the push pin and the longitudinal bore 70 of the main valve and into the transverse bore 48 and out ports 71 and 72. First actuator 50 continues to move leftwardly as coupling proceeds engaging main valve 41 unseating it from seat 36 of the seal gland valve 35 permitting communication between the male and female halves of the coupling. Detents 22 move into notch 17 under the urging of the locking sleeve 25 driven by spring 24 (sometimes referred to herein as the fifth spring) locking the male and female halves of the coupling together.

To disconnect the coupling, locking sleeve 25 must be rotated until slot 65 is aligned with stop 21 so as to permit leftward retraction of sleeve 25 against the force of spring 24. Main valve 41 is first closed followed by ball valve 51 and finally followed by sliding sleeve valve 42 during the uncoupling process.

The invention has been described herein and depicted in the drawings in detail. It will be obvious to those skilled in the art that several modifications and changes may be made to the foregoing invention without departing from the spirit and scope of the appended claims which are not limited to the embodiments shown and described herein.

We claim:

1. A female coupling half comprising: a body; a seal gland having a valve seat; an actuator; a main valve having a vent valve; and a sliding sleeve valve; said sliding sleeve valve residing adjacent said actuator; and, said actuator residing adjacent said vent valve and said main valve for actuation of said vent valve and said main valve.

2. A female coupling half as claimed in claim 1 further comprising an outer valve guide and a first spring operable between said outer valve guide and said main valve.

3. A female coupling half as claimed in claim 2 further including an inner valve guide; and, said main valve and said inner valve guide are threaded together.

4. A female coupling half as claimed in claim 3 wherein said main valve includes an interior valve seal and said vent valve includes a ball valve and a second spring operable between said ball valve and said inner valve guide.

5. A female coupling half as claimed in claim 4 wherein said main valve includes a seal for sealing against said valve seat of said seal gland.

6. A female coupling half comprising: a body; an adaptor; said body and said adaptor being threaded together; an intermediate member; a seal gland having a main valve seat; a first actuator and a second actuator; a main valve having a vent valve, an interior seat, and a vent port; a sliding sleeve valve residing adjacent said first actuator; said second actuator residing adjacent said first actuator; an inner and an outer valve guide; said inner valve guide affixed to said main valve; a first spring operable between said outer valve guide and said main valve urging said main valve into engagement with said main valve seat of said seal gland; said vent valve includes a ball valve; a second spring operable between said ball valve and said inner valve guide urging said ball valve into engagement with said interior seat of said main valve; a pintle retainer secured in place with respect to said seal gland and said intermediate member; a pintle affixed to said pintle retainer; said seal gland and said intermediate member being affixed to said adaptor and said body member; an engaging sleeve; a third spring operable between said engaging sleeve and said intermediate member; a fourth spring operable between said intermediate member and said sliding sleeve valve; said body includes a plurality of apertures; a plurality of locking balls residing in said plurality of apertures; a locking sleeve for retaining said plurality of locking balls in said plurality of apertures of said body; and, a fifth spring operable between said body and said locking sleeve urging said locking sleeve in a direction away from said adaptor.

7. A coupling comprising: a male half; a female half; said female half includes a body, a main valve having an open and a closed position, a vent valve, a valve guide, said vent valve includes a ball valve and a first spring operable between said ball valve and said main valve, a second spring operable between said valve guide and said main valve urging said main valve to said closed position when said male and female halves are uncoupled, and said male half of said coupling engaging said female half of said coupling urging said main valve to said open position compressing said second spring when said male and female halves are coupled together.

8. A coupling as claimed in claim 7 wherein said vent valve of said female half has an open position and a closed position, said female half further includes an actuator, said actuator forcibly engages said ball valve of said vent valve compressing said first spring positioning said vent valve in said open position when said male and female halves are coupled together, and, said actuator not forcibly engaging said ball valve of said vent valve when said male and female halves are uncoupled permitting said second opening to position said vent valve in said closed position.

9. A coupling comprising: a male half; a female half; said female half includes a body, a pintle, a main valve, a relief valve and a sliding sleeve valve; when uncoupled said main valve seats against said body, said relief valve seats against said main valve, and said sliding sleeve valve seats against said pintle; and sliding sleeve valve unseats from said pintle followed by unseating of said relief valve from said main valve followed by unseating of said main valve from said body upon coupling with said male half of said coupling.

10. A coupling as claimed in claim 9 wherein said female further includes an actuator for unseating said relief valve when said female and male halves of said coupling are coupled together.

11. A female half of a coupling comprising; a body; a main valve; a relief valve comprising a ball valve; a main valve guide; said main valve includes an elastomeric interior valve seal; a spring operable between said main valve guide and said relief valve; a pintle retainer; a pintle affixed to said pintle retainer; said pintle retainer affixed to said body of said female half; a sliding sleeve valve; an actuator; said pintle retainer includes a passageway and, said actuator residing partially in said passageway.

12. A coupling comprising: a male half; said male half includes a male body and a male valve; a female half; said female half includes a body, a pintle, a main valve, a relief valve and a sleeve valve, said main valve seats against said body, said relief valve seats against said main valve, and said sleeve valve seats against said pintle when said male and female halves of said coupling are uncoupled; and, during coupling, said male body urges said sliding sleeve valve into engagement with said actuator unseating said sleeve valve from said pintle followed by unseating of said relief valve from said main valve followed by unseating of said main valve from said body.

13. A coupling as claimed in claim 12 wherein said main valve includes an interior seal and said relief valve seats against said seal.

14. A coupling as claimed in claim 13 wherein said relief valve is a ball.

15. A female coupling half comprising: a body; a main valve having a bore, a relief valve and a push pin; said relief valve comprises a ball and a spring operable between said ball and said main valve; said main valve includes an elastomeric seal and said relief valve seats against said main valve; said push pin residing partially in said bore of said main valve for actuation of said relief valve, and, said push pin includes a longitudinal flat edge forming a passageway between said bore of said main valve and said push pin.

16. A female coupling half as claimed in claim 15 wherein said main valve includes a port which communicates with said passageway in said main valve.

* * * * *

UNITED STATES PATENT AND TRADEMARK OFFICE
CERTIFICATE OF CORRECTION

| | |
|---|---|
| PATENT NO. | : 6,095,190 |
| DATED | : August 1, 2000 |
| INVENTOR(S) | : Wayne Wilcox et al. |

It is certified that error appears in the above-identified patent and that said Letters Patent is hereby corrected as shown below:

<u>Column 7,</u>
Line 6, after "and", insert -- said --.

Signed and Sealed this

Twelfth Day of October, 2004

JON W. DUDAS
*Director of the United States Patent and Trademark Office*